United States Patent
Simadiris et al.

(10) Patent No.: US 7,421,849 B2
(45) Date of Patent: *Sep. 9, 2008

(54) LIQUID GALLEY REFRIGERATION SYSTEM FOR AIRCRAFT

(75) Inventors: George Simadiris, Anaheim, CA (US); Ian Douglas Oswald, Villa Park, CA (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/603,262

(22) Filed: Nov. 20, 2006

(65) Prior Publication Data

US 2007/0084226 A1    Apr. 19, 2007

Related U.S. Application Data

(63) Continuation of application No. 11/081,446, filed on Mar. 16, 2005, now Pat. No. 7,137,264, which is a continuation of application No. 09/947,222, filed on Sep. 5, 2001, now Pat. No. 6,880,351.

(51) Int. Cl.
  *F25D 17/02* (2006.01)
  *B60H 1/32* (2006.01)

(52) U.S. Cl. .............. 62/185; 62/434; 62/239

(58) Field of Classification Search ............. 62/185, 62/434, 239, 430, 237, 438; 165/104.28
See application file for complete search history.

(56) References Cited

U.S. PATENT DOCUMENTS 2,779,171 A    1/1957  Lindenblad
3,216,215 A   11/1965  Schuett
4,890,463 A    1/1990  Cantoni
5,052,472 A   10/1991  Takahashi
5,265,437 A   11/1993  Saperstein et al.
5,369,960 A *  12/1994  Mueller et al. ............. 62/238.6
5,491,979 A    2/1996  Kull et al.
5,496,000 A    3/1996  Mueller
5,513,500 A    5/1996  Fischer et al.
6,014,866 A    1/2000  Durham
6,880,351 B2   4/2005  Simadiris et al.
7,137,264 B2 * 11/2006  Simadiris et al. ............. 62/185

* cited by examiner

*Primary Examiner*—Chen-Wen Jiang
(74) *Attorney, Agent, or Firm*—Fulwider Patton LLP

(57) ABSTRACT

The liquid galley refrigeration system for cooling food carts for aircraft employs an intermediate working fluid to transfer heat from one or more food carts to one or more remote chillers, allowing the carts and chillers to be advantageously distributed in the aircraft. A plurality of heat exchanges effect a cooling of the carts wherein heat from the food cart is first transferred to a first airflow; heat from the first airflow is then transferred to an intermediate working fluid that is circulated between a location immediately adjacent the food carts and a remote chiller; heat from the intermediate working fluid is subsequently transferred to the chiller working fluid; and finally, heat from the chiller working fluid is expelled. While the chiller working fluid undergoes a phase change in order to transfer heat from the intermediate working fluid to the cooling air, the intermediate working fluid remains in its liquid phase throughout its circulation. A recirculation pump circulates the intermediate working fluid through a distribution system that may link a plurality of chillers to a plurality of food carts, and the temperature of the food carts is regulated by a combination of controls.

3 Claims, 13 Drawing Sheets

LIQUID GALLEY REFRIGERATION SYSTEM FOR AIRCRAFT

RELATED APPLICATIONS:

This is a continuation of Ser. No. 11/081,446, filed Mar. 16, 2005, now U.S. Pat. No. 7,137,264, which is a continuation of Ser. No. 09/947,222, filed Sep. 5, 2001, now U.S. Pat. No. 6,880,351.

BACKGROUND OF THE INVENTION

1. Field of the Invention

This invention relates to transport aircraft galley systems, and more particularly, to systems to cool food carts prior to service by the cabin attendants.

2. Description of Related Art

Aircraft galley systems for modern transport aircraft incorporate food carts which are cooled to prevent food spoilage prior to use by the cabin attendants for distribution of food to the passengers. These food carts have in the past been interfaced with cold air supply systems in the galley designed to cool the interiors of the food carts. Such cool air distribution systems were generally co-located with the balance of the galley and interface to the food carts by means of gaskets connecting the food carts to a plenum containing the cool air.

As space in modern aircraft has become more at a premium and more efficient means of cooling the carts has become necessary, there has emerged a need for alternatives to such systems. Furthermore, recent FDA rulings have lowered the required temperature at which the interior of the food carts has to be kept in order to prevent food spoilage. Additionally, it has become more desirable to remove refrigeration equipment from the galley compartment and to find other means to properly cool the food carts without locating the entire refrigeration system in the galley area. In order to be compatible with modern transport aircraft requirements, it has become important to have an increased degree of safety and modularity for any aircraft system incorporating electronics or electric pumps, and it would be particularly desirable to locate at least a portion of such systems outside of the cabin area of the aircraft. In any event, it is important that any system that interfaces with either food or the cabin area is non-toxic and can be configured to provide a wide range of cooling capacity as a function of the food and food carts that are to be interfaced with such a system. The present invention satisfies these and numerous other requirements for transport aircraft.

SUMMARY OF THE INVENTION

The present invention overcomes the shortcomings of previously known systems for cooling food carts in aircraft. The system of the invention serves to not only remove the bulk of the refrigeration system from the galley area but also obviates the need to accommodate bulky air ducts that would supply cooled air from refrigeration stations directly to the carts. Additionally, the system allows low temperatures to be readily achieved in a very controllable manner.

In general terms, the invention employs an intermediate working fluid to transfer heat from a cart or carts to a remote chiller or chillers. In a presently preferred embodiment, the components of the system may be advantageously positioned in the aircraft and do not have to be contained in a single location. More specifically, the invention utilizes a plurality of heat exchangers to effect a cooling of the carts wherein heat from the food cart is first transferred to an airflow; heat from the airflow is then transferred to an intermediate working fluid which is circulated between a location immediately adjacent the food carts and a remote chiller; heat from the intermediate working fluid is subsequently transferred to the chiller working fluid; and finally, heat from the chiller working fluid is expelled to ambient air.

While in the currently preferred embodiment, the chiller working fluid undergoes a phase change in order to transfer heat from the intermediate working fluid to the ambient air, the intermediate working fluid typically remains in its liquid phase throughout its circulation. A recirculation pump serves to circulate the intermediate working fluid through a distribution system that may link a plurality of chillers to a plurality of food carts. An expansion tank accommodates the expansion and contraction that the intermediate working fluid undergoes during its circulation. Each of the chillers cycles the associated chiller working fluid between a condenser and evaporator in a conventional manner whereby an expansion valve is relied upon to control the phase change therebetween.

The temperature of the food cart is regulated by a combination of controls. The speed of a fan circulating air flowing over the heat exchanger for the intermediate working fluid and directing the air cooled in this manner through the food cart may be varied so as to influence the rate of heat transfer between the food cart and the intermediate working fluid. A variable flow valve may be used to control the flow of intermediate working fluid to each cart, while the flow velocity of the intermediate working fluid circulating in the entire distribution system may be controlled by varying the speed of the recirculation pump. Finally, each of the chillers may be turned on or off depending upon the temperature of the intermediate working fluid returning from the food carts. Temperature sensors and pressure sensors are positioned throughout the system to monitor these parameters at appropriate locations in order to allow the operation of the overall system to be properly controlled by the use of electronic controls such as programmable industrial controllers. (PIDs)

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 1:
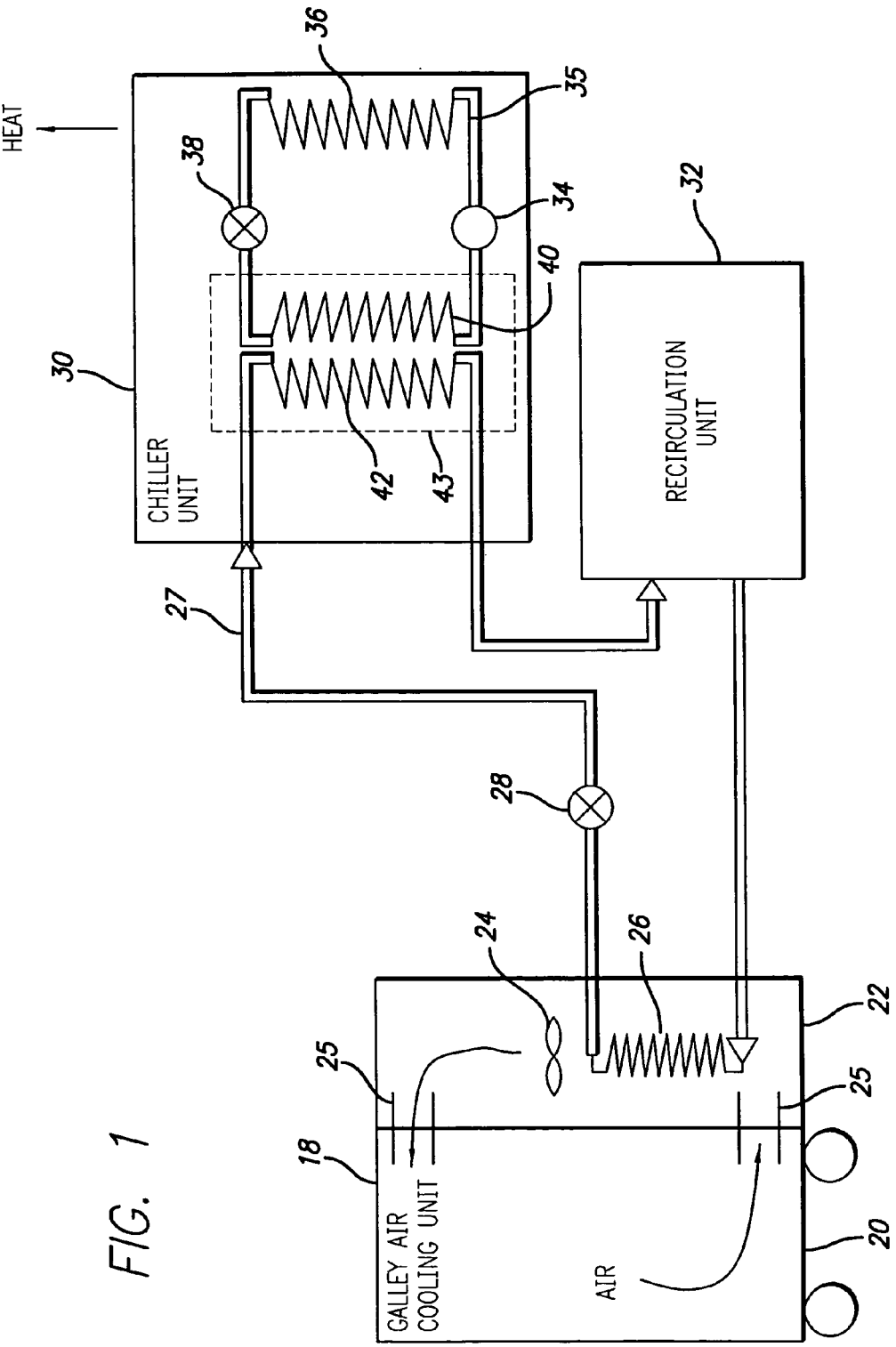
FIG. 1 is a schematic diagram illustrating a general overview of the galley refrigeration system for aircraft according to the invention.

The present invention is directed to a system for refrigerating food carts within an aircraft galley system. Generally, the system includes a set of remote chillers which remove heat from a distributed liquid refrigerant system, which in turn removes heat from one or more food carts to refrigerate the food carts. The entire system is electronically monitored and controlled to provide a sufficiently chilled environment within a potentially large number of food carts.

More specifically, the present invention includes three distributed refrigeration subsystems, and an electronic control subsystem for monitoring and controlling the refrigeration subsystems. The first refrigeration subsystem includes at least one remote chiller, the second refrigeration subsystem includes at least one galley air cooling unit, and the third refrigeration subsystem includes at least one recirculation unit.

Each remote chiller constitutes a self-contained refrigeration unit, which serves to remove heat from a liquid refrigerant, referred to as the intermediate working fluid. The intermediate working fluid is then distributed to the second refrigeration subsystem. The galley air cooling units each include a galley cart and a galley plenum. The chilled intermediate working fluid is distributed into and exits from a heat exchanger within the galley plenum. A blower or fan within the plenum blows air over the exchanger and through the galley cart. In this manner, the galley cart may be continually flushed with air chilled by the galley plenum heat exchanger.

Upon exiting the galley plenum the intermediate working fluid is distributed to the third refrigeration subsystem. Each recirculation unit may include one or more liquid pumps and expansion tank or accumulator. The one or more pumps of the recirculation units pressurize the intermediate working fluid for redistribution to the remote chillers. The accumulators of the recirculation units allow for the storage and thermal expansion of the intermediate working fluid.

The electronic control subsystem is also a distributed system which may monitor and control individual components of each refrigeration subsystem. Individual electronic devices may be used to monitor and control the temperature within each galley cart. The galley air cooling units may include a control valve to vary the amount of liquid refrigerant entering the galley plenum. The electronic devices monitoring the temperature of the air in the galley cart may be used to adjust the control valve. These same electronic devices may also be used to turn the fan in the galley plenum on and off.

Other electronic devices may be used to monitor and control the recirculation units. These electronic devices monitor and control the recirculation units. These electronic devices may also be configured to monitor the pressure and volume within the expansion tank. The recirculation units may be controlled by turning the pumps on and off or by varying the speeds by which the pumps operate.

Other electronic devices may also be used to monitor and control the remote chillers. By monitoring the pressure and temperature within the remote chiller the electronic devices can appropriately determine which remote chillers to operate at different times.

The electronic subsystem may be powered by the aircraft electrical power systems. The electronic subsystem may also include any number of display systems and interfaces for control by the crew. An overall control system may operate each individual electronic device.

The entire system and each individual component should be configured for operation within the unique environment presented by transport aircraft. Equipment used on commercial aircraft must meet strict requirements. In addition to maintaining food at safe temperatures, general aircraft operating requirements must be met. The size and weight of the system must be kept to a minimum. The reliability and ease of maintenance are key economic considerations. Fire suppression, non-toxicity and electromagnetic interference (EMI) shielding are key safety considerations. The present invention allows for these concerns, and others, to be met satisfactorily.

As depicted in FIG. 1, several components combine to form a galley air cooling unit 18. A galley cart 20 is typically stored within a galley plenum 22 while storing food. To safely store the food the air within the galley cart must be stored at or below a specific temperature. For example, 39° F. (4° C.) is the temperature required by certain agencies. The galley plenum is equipped with gaskets to form an air tight seal with the galley cart. Preferably the galley plenum is equipped with a blower 24 or fan which circulates air throughout the galley cart and over at least one heat exchanger 26 within the galley plenum. Ducts 25 between the galley cart and the galley plenum direct the flow of air across the stored food.

The heat exchanger 26 within the galley plenum 22 may include a plate and fin configuration optimized for removing heat from passing air. The present invention contemplates the exchange of thermal energy between ambient air and a liquid refrigerant, also referred to as a heat transfer fluid, or the intermediate working fluid 27. A known heat transfer fluid having appropriate thermal and physical properties for use with the present invention is a fluorinated heat transfer fluid sold under the trademark GALDEN® HT 135. GALDEN® HT 135 is a perfluoropolyether or PFPE fluid sold by the Ausimont Montedison Group, although other similar heat transfer fluids may also be suitable.

A large number of the galley carts 20 (e.g. 45) may be required on a single aircraft. In a currently preferred embodiment, each galley cart may require a thermal exchange of approximately 750-1000 BTUs per hour. The corresponding air flow requirement of each galley cart in such an arrangement would then be approximately 72 cubic feet per minute. The corresponding fluid flow through each heat exchanger 26 would be approximately 0.64 gallons per minute (using GALDEN®HT 135). Systems in accordance with the present invention may be designed to meet these requirements for as many galley carts as are used on an aircraft.

A proportional flow valve 28 may be used to control the flow of the intermediate working fluid 27 from each heat exchanger 26 within the galley plenum 22. It is also contemplated that a single proportional flow valve may control the flow of fluid into two or more heat exchangers. One method of controlling the temperature of the air within the galley cart 20 is to electronically manipulate the proportional flow valve so as to regulate the flow of fluid into the heat exchanger.

As depicted in FIG. 1, the source of the chilled intermediate working fluid is at least one remote chiller unit 30. After exiting the heat exchanger 26 within the galley plenum 22 the intermediate working fluid is no longer chilled. The unchilled intermediate working fluid is returned to the chiller unit via the valve 28, cooled, and redistributed throughout the system by at least one recirculation unit 32.

Figure 2:
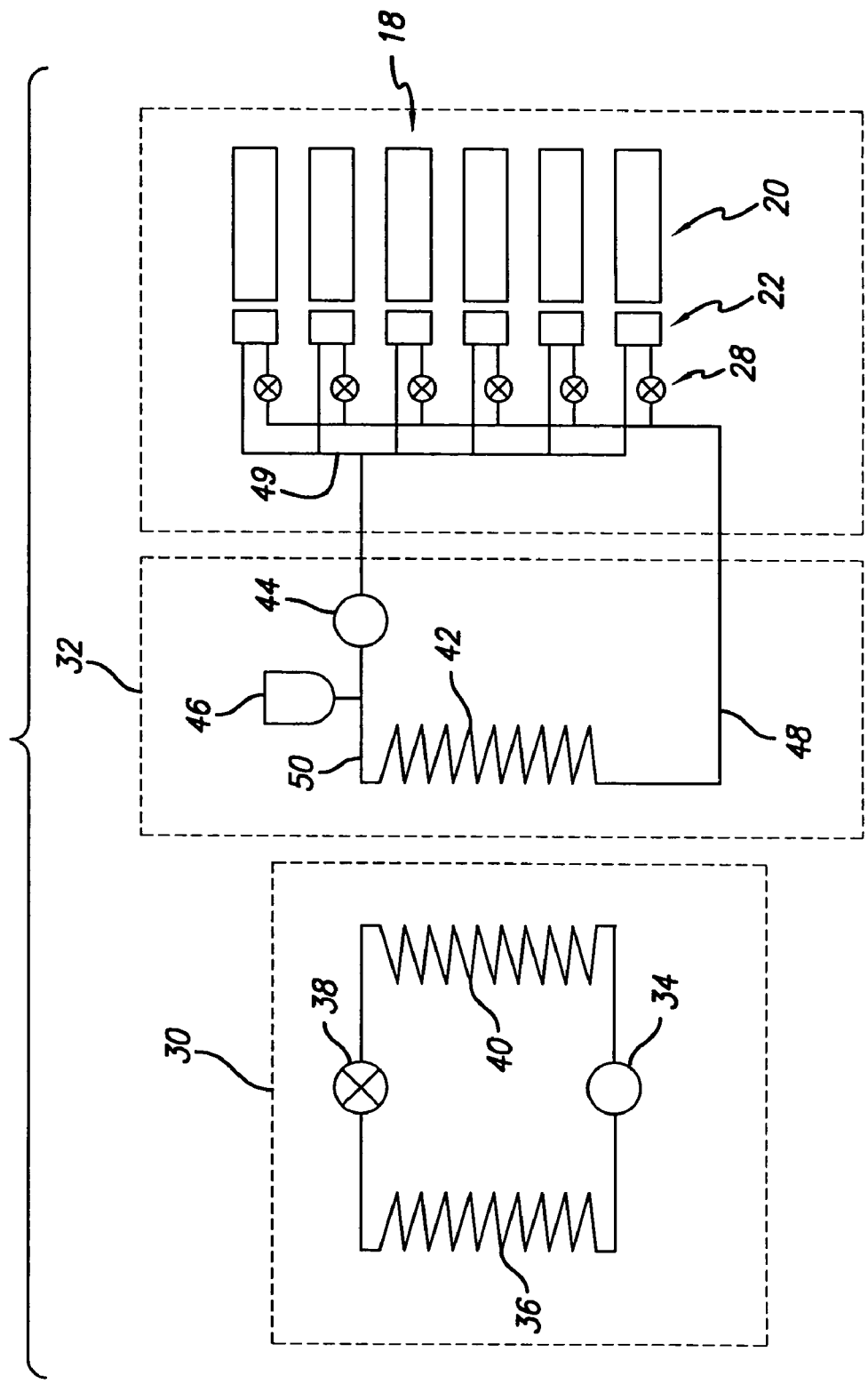
FIG. 2 is a schematic diagram illustrating the general design parameters of the galley refrigeration system for aircraft according to the invention.

As depicted schematically in FIG. 2, a simple system conforming to the present invention may consist of a remote chiller unit 30 and a redistribution unit 32 refrigerating several galley carts 20. As an example, the liquid chiller unit may be configured as a vapor cycle refrigeration unit. In such a unit, a compressor 34 (a pump or other machine that increases the pressure of a gas) may be powered by the aircraft's electrical system. Preferably, a rotary-type compressor is used to compress low temperature and pressure vapor into high temperature and pressure super-heated vapor. The material to form this vapor is also a refrigerant and may be referred to as a chiller working fluid 35 (See FIG. 1). A known material which has appropriate thermal and physical properties for use with the present inventions as the chiller working fluid is a hydrofluorocarbon refrigerant such as that sold under the name HFC-134a available from DuPont, or sold under the name MEFOREX 134a, or HT 134a, available from Ausimont, as a replacement for CFC12, although other similar refrigerants may also be suitable.

From the compressor 34, the chiller working fluid 35 flows into a condenser 36. The condenser is preferably configured as a tube-fin heat exchanger to maximize heat rejection. From the condenser, the chiller working fluid flows through an expansion valve 38 into an evaporator 40. The evaporator is preferably configured as a plate-fin heat exchanger to maximize heat absorption.

Associated with the evaporator 40 is an expelling heat exchanger 42. The intermediate working fluid 27 flows through the expelling heat exchanger. The association of the evaporator with the expelling heat exchanger forms a chiller unit heat exchanger 43 (see FIG. 1) and enables a thermal exchange between the intermediate working fluid and the chiller working fluid 35 without the fluids ever mixing. As the chiller working fluid passes through the evaporator 40, back into the compressor 34, it draws heat from the expelling heat exchanger and the intermediate working fluid.

A remote chiller unit 30 in accordance with this invention may be required to maintain a required low temperature in several galley carts 20. As an example, the total heat rejection required of a single remote chiller unit may be 18,000 BTUs per hour. This would require a flow rate of the intermediate working fluid 27 of 4.6 gallons per minute (using GALDEN®HT135). A corresponding flow rate through the condenser would be 700 cubic feet per minute at 3.5 inches $H_2O$ pressure (using HT-134a). This could be supplied by a condenser blower wheel operating at 5,750 revolutions per minute. Further requirements of such a remote chiller unit 30 may be an air venting fan as well as a mechanical bypass valve.

The unchilled intermediate working fluid 27 flows out of the heat exchanger 26 in the galley plenum 22 and is redistributed to a liquid pump 44 in at least one recirculation unit 32. The liquid pump may be configured as a turbine impeller pump which delivers relatively high pressure at relatively low flow rates. The liquid pump should be entirely sealed to prevent any leakage of the intermediate working fluid. The liquid pumps supply all the force required to maintain the circulation of the intermediate working fluid through the components of the system.

Within the recirculation unit 32, the intermediate working fluid 27 flows into an expansion tank 46. The expansion tank functions as an accumulator and a reservoir for the intermediate working fluid. The expansion tank allows for thermal expansion of the intermediate working fluid. Preferably, throughout the entire process, the intermediate working fluid remains in the liquid state.

Each recirculation unit 32 may gather intermediate working fluid 27 from several galley air cooling units 18. Each recirculation unit may also provide intermediate working fluid to several remote chiller units 30. As an example, the flow rate through a single recirculation unit may be 10 gallons per minute. The recirculation units may also be required to provide a pressure differential of 100 pounds per square inch in the intermediate working fluid.

Figure 3:
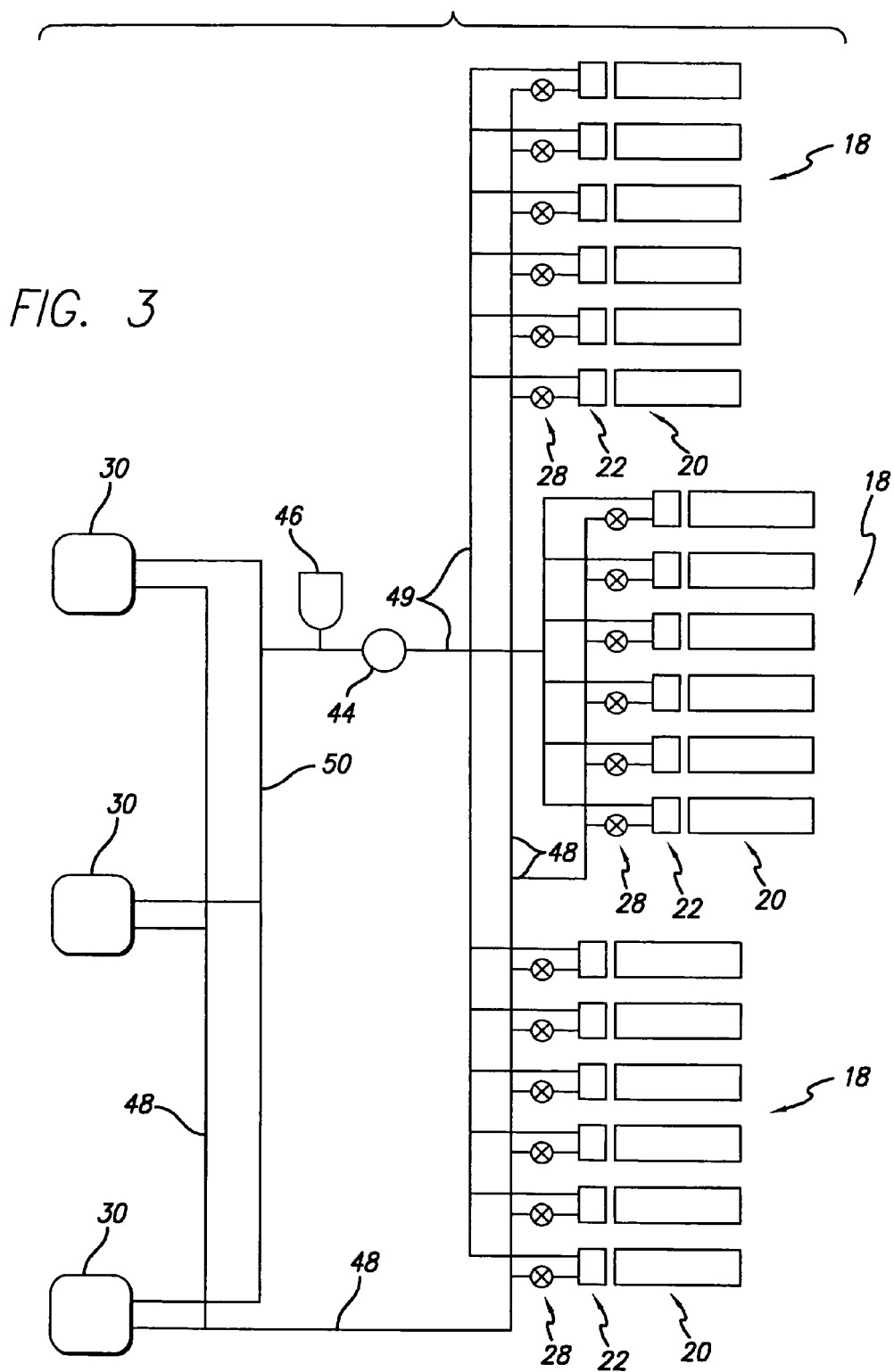
FIG. 3 is a schematic diagram of a distributed version of the galley refrigeration system for aircraft according to the invention.
Figure 4:
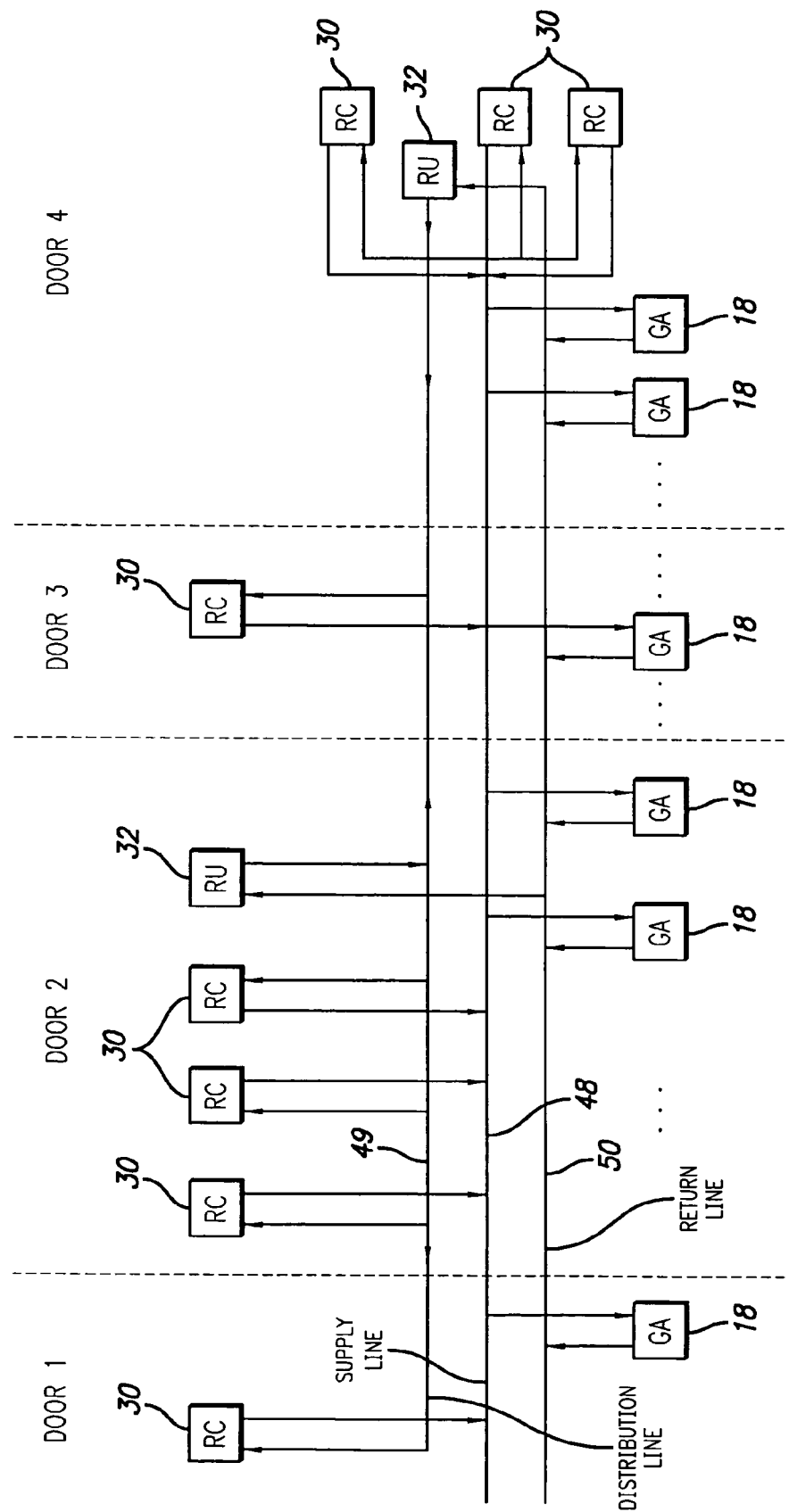
FIG. 4 is a schematic diagram of a first version of a layout of a distributed galley refrigeration system for aircraft according to the invention.
Figure 5:
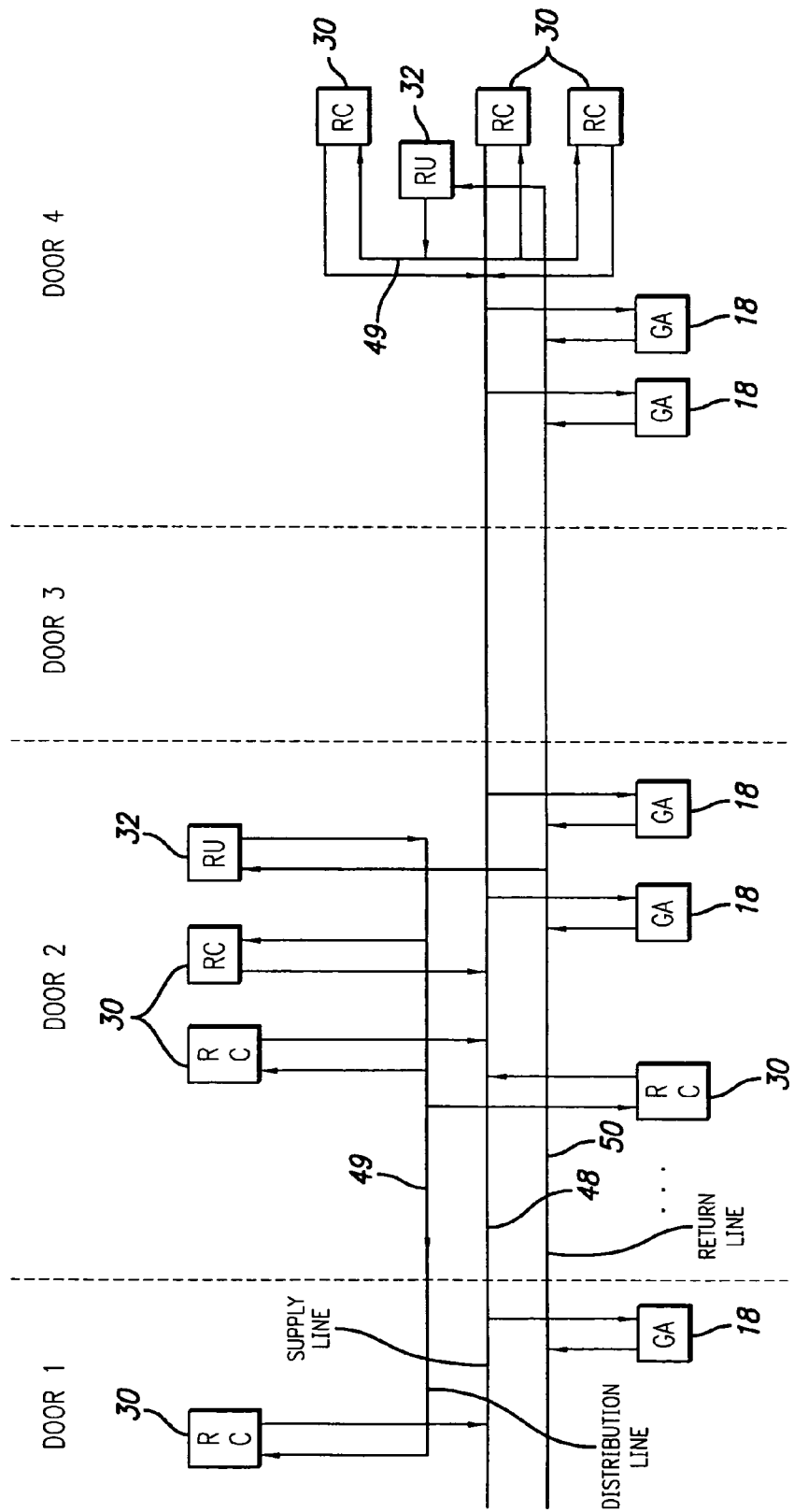
FIG. 5 is a schematic diagram of a second version of a layout of a distributed galley refrigeration system for aircraft according to the invention.
Figure 6:
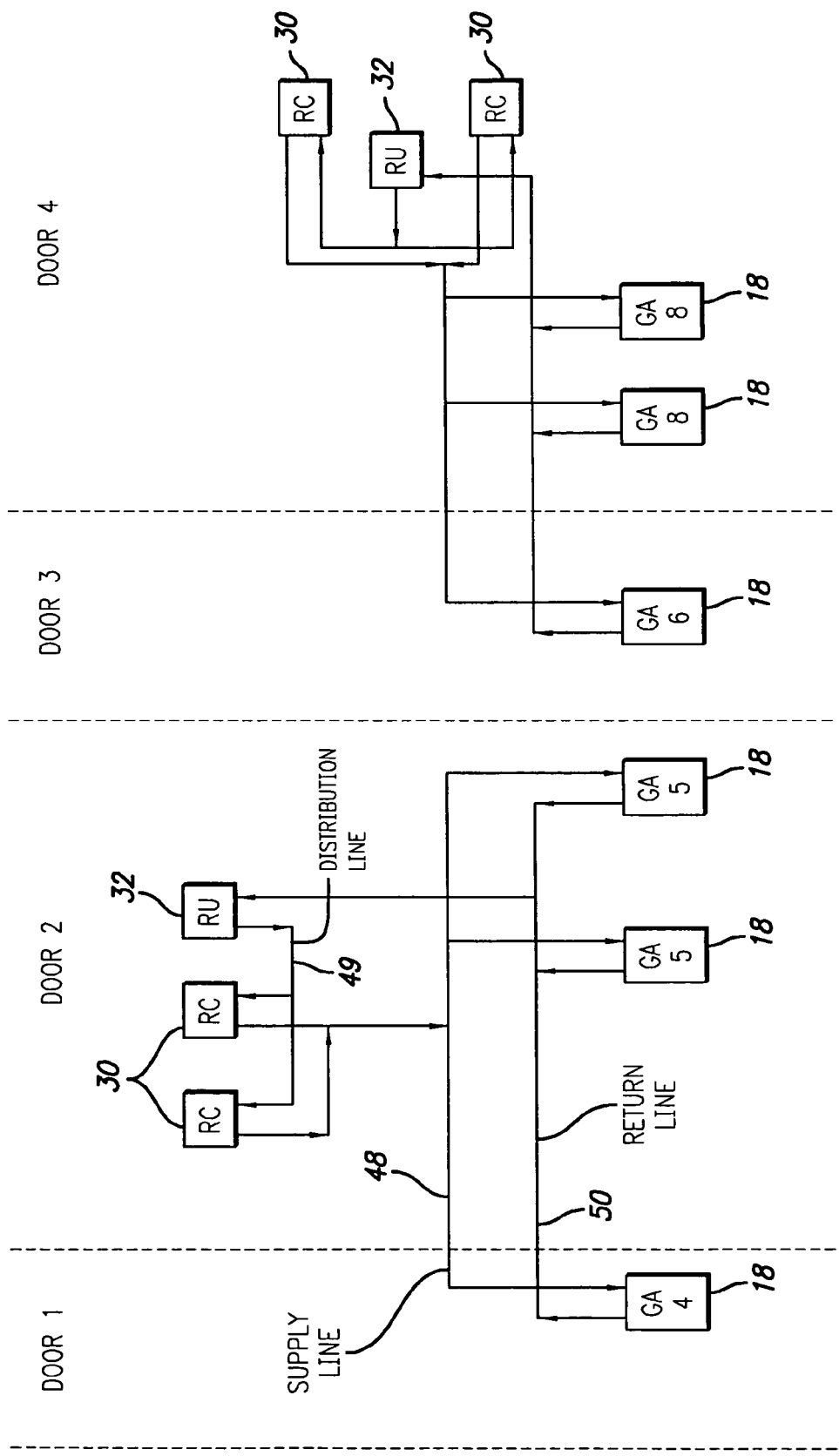
FIG. 6 is a schematic diagram of a third version of a layout of a distributed galley refrigeration system for aircraft according to the invention.
Figure 7:
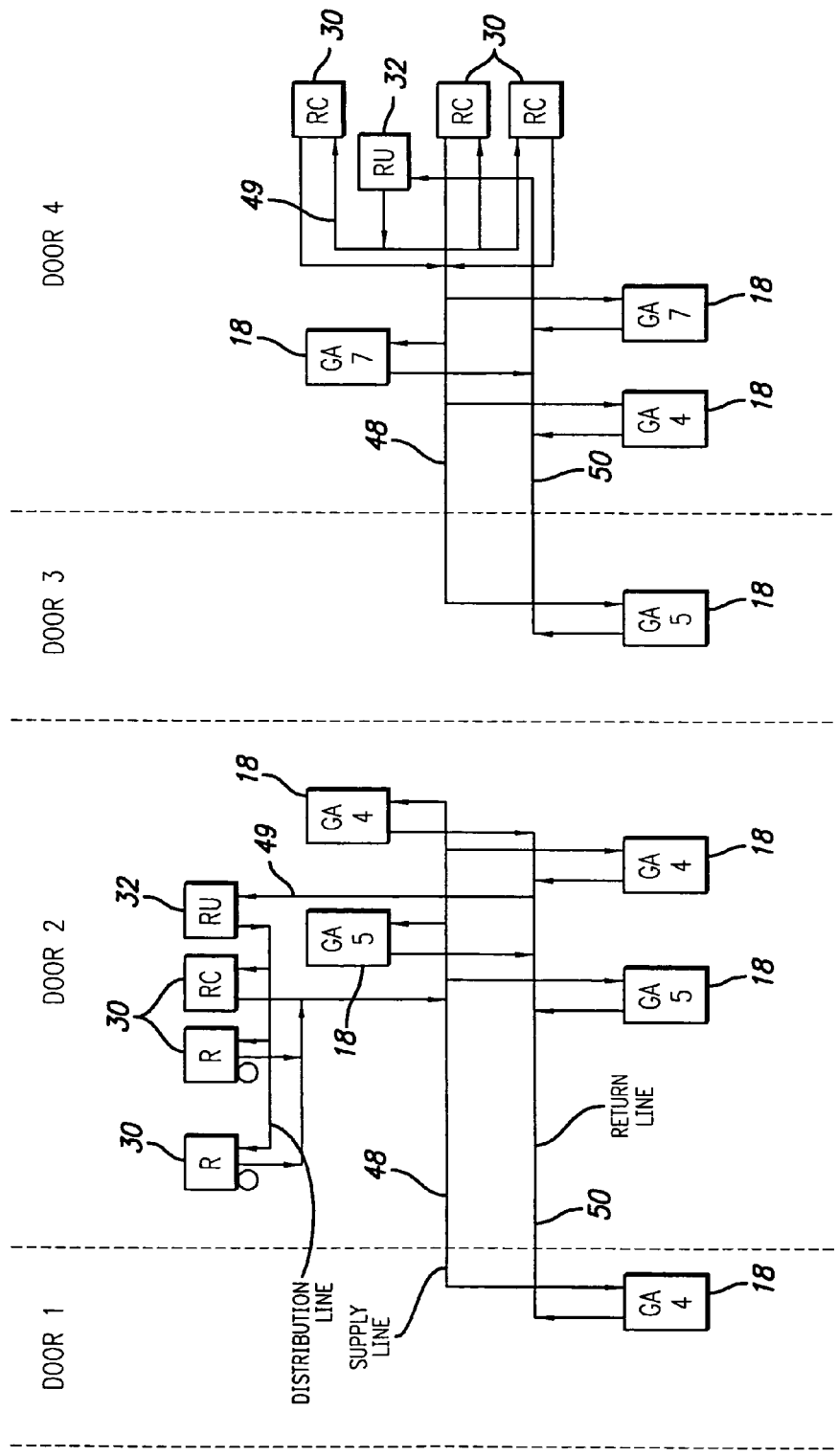
FIG. 7 is a schematic diagram of a fourth version of a layout of a distributed galley refrigeration system for aircraft according to the invention.

As depicted in FIG. 3, systems conforming to the present invention may be distributed systems. That is, a plurality of remote chiller units 30 may combine to remove heat from a plurality of galley carts 20, and the entire system may be continually recirculated by at least one recirculation unit 32. This permits the remote chiller units 30 and recirculation units 32 to be located at an accommodating distance from the galley carts 20. Because of the limited space available on commercial transport aircraft this can be very advantageous.

To circulate the intermediate working fluid 27 throughout the distributed system, a network of ducts connects the individual components. Supply ducts 48 are configured to distribute the chilled intermediate working fluid to the galley air cooling units 18. Redistribution ducts 49 are configured to route the unchilled intermediate working fluid to the liquid pumps 44. Return ducts 50 are configured to distribute the unchilled intermediate working fluid to the remote chiller units 30.

FIGS. 4-7 depict various configurations of the present invention. The differing configurations of various commercial aircraft require a great deal of flexibility in placement of remote chiller units 30 and recirculation units 32. As the galley carts 20 may be distributed in various galleys throughout the aircraft, the supply ducts 48, redistribution ducts 49 and return ducts 50 may run potentially throughout the entire aircraft. The present invention allows each of the components of the refrigeration system to be distributed to accommodating locations within the galleys or nearby.

Figure 8A:
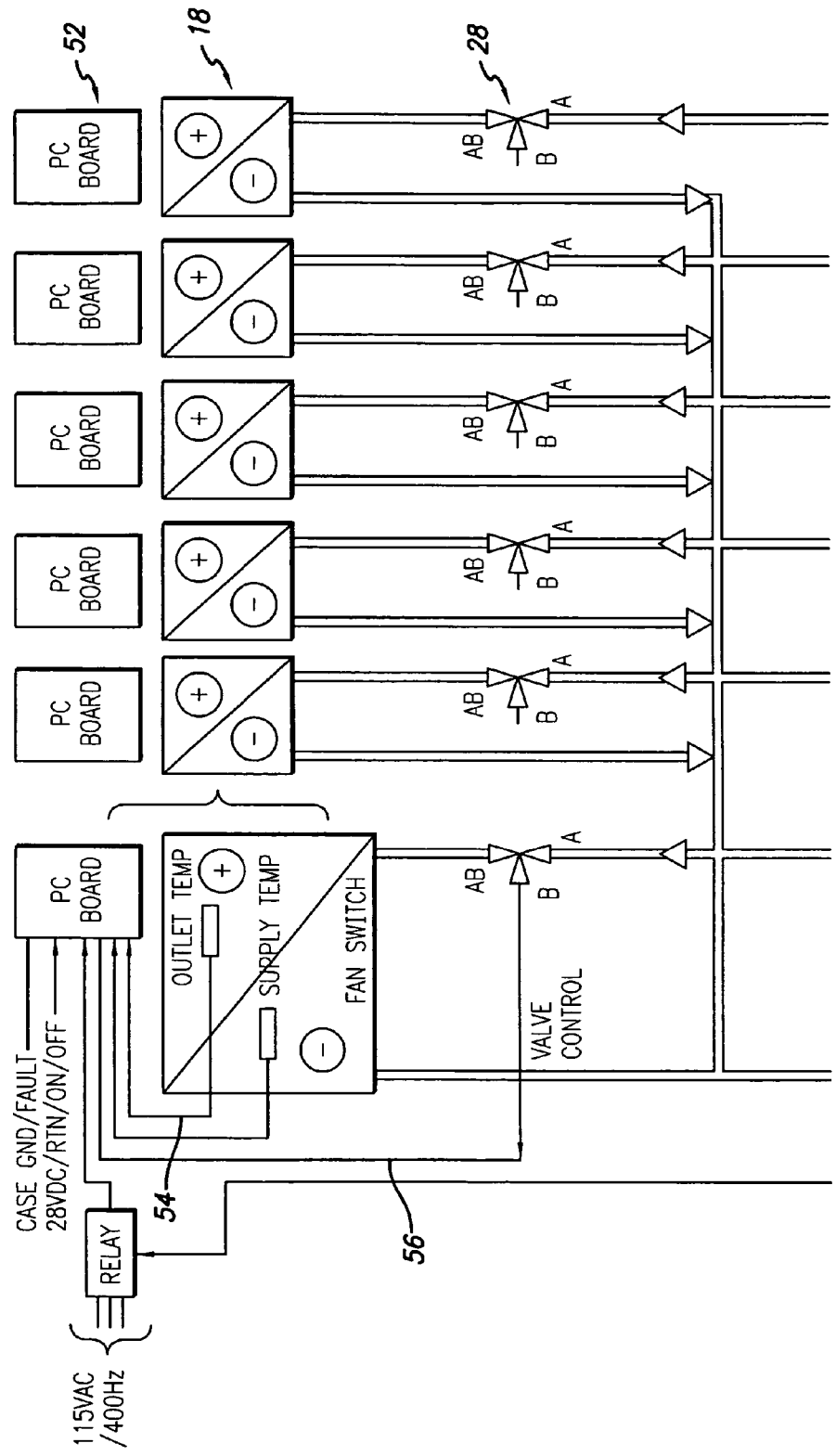
FIG. 8 is a schematic diagram of an electronic control system for controlling the galley refrigeration system for aircraft according to the invention.
Figure 8B:
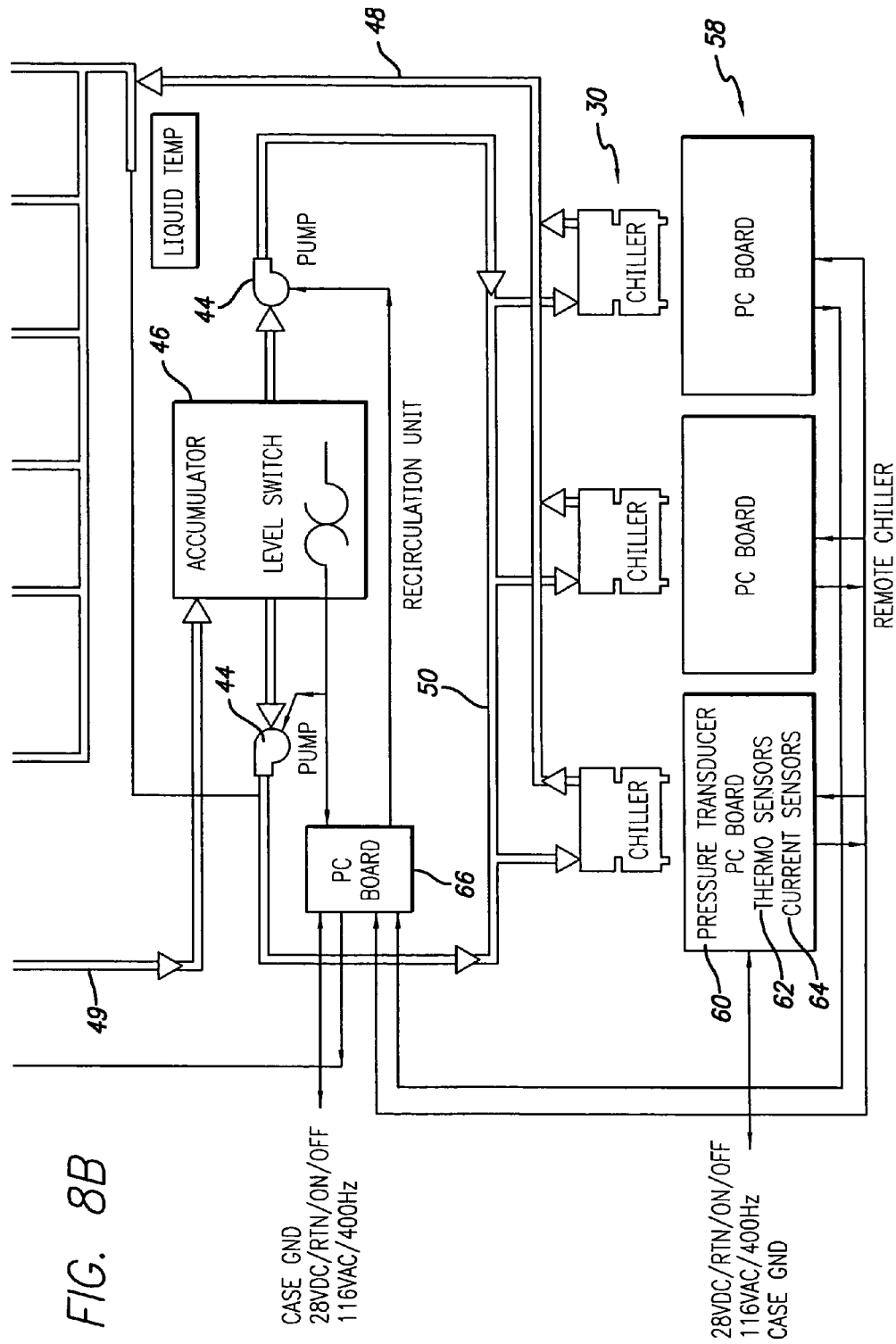

As depicted in FIG. 8, the present invention may also include a comprehensive electronic subsystem to monitor and control the distributed refrigeration system. A galley cart control device 52 may be associated with each galley air cooling unit 18. An air outlet temperature sensor 54 and an air supply temperature sensor 56 may each provide input to the galley cart control device. The galley cart control device may then turn on or off the blower 24 as well as control the output of the proportional flow valve 28.

A chiller unit monitoring device 58 may be associated with each remote chiller unit 30. By means of a pressure transducer 60, a thermo-sensor 62 and a current sensor 64 the chiller unit monitoring device may measure the function of the remote chiller unit. If needed, the chiller unit monitoring device could shut down the remote chiller unit.

A system monitoring and control device 66 may be associated with each recirculation unit 32, or may be associated with the system as a whole. The system monitoring and control device may monitor the volume and pressure within each expansion tank 46 as well as the functioning of the liquid pumps 44. Furthermore, the system monitoring device may monitor the temperature and pressure of the intermediate working fluid 27 at various locations within the system. The system monitoring and control device may also receive input from the chiller unit monitoring devices 58 and the galley cart control devices 52. With this information, the system monitoring and control device may control the functioning of each and every electronic and refrigeration component of the entire system.

Figure 9:
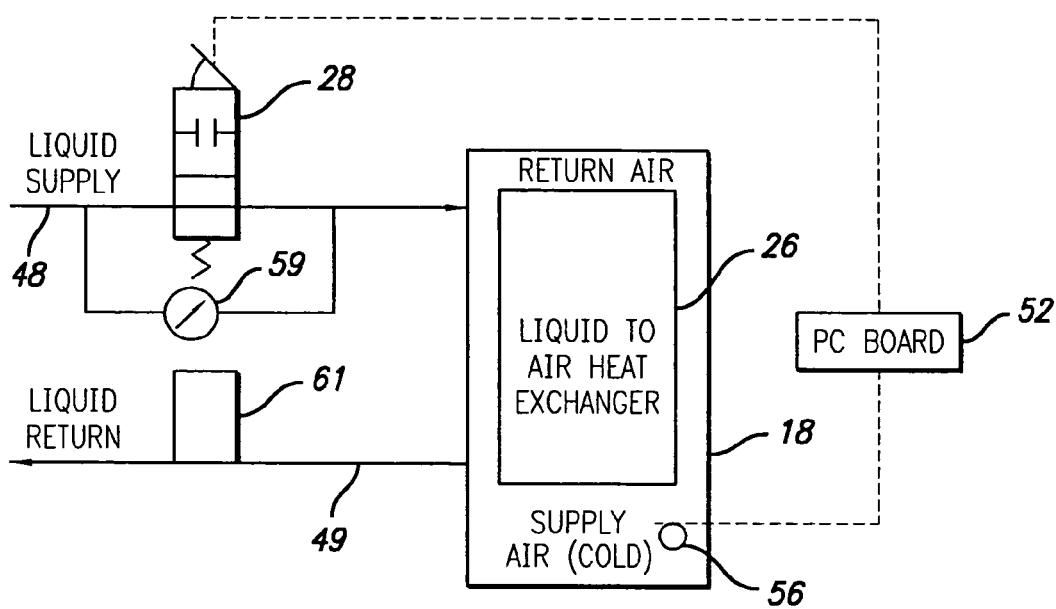
FIG. 9 is a schematic diagram of a galley air cooling unit of the galley refrigeration system for aircraft according to the invention.

As depicted in FIG. 9, the galley cart control device 52, may control the temperature of the air in the galley cart 20 by regulating the flow of the intermediate working fluid 27 into the heat exchanger 26 within the galley plenum 22. The air supply temperature sensor 56 measures the temperature of the cold supply air and relays that information to the galley cart control device. In order to ensure that the cold supply air remains near a specified temperature (e.g. 30° F. (−1° C.)) the galley cart control device can increase or decrease the flow of intermediate working fluid by controlling the proportional control valve 28. As the flow of the intermediate working fluid into the heat exchanger increases the temperature of the supply air will decrease and vice versa. The galley control device may also monitor the temperature of the intermediate working fluid at various locations or the temperature of the air returning to the heat exchanger. Furthermore, a differential pressure gauge 59 on the supply ducts 48 and a flow meter 61 on the redistribution ducts 49 may provide additional information about the flow of intermediate working fluid into and out of the galley air cooling unit 18. The galley cart control device could use this further information to more efficiently regulate the proportional flow valve or to turn the blower 24 on and off.

Figure 10:
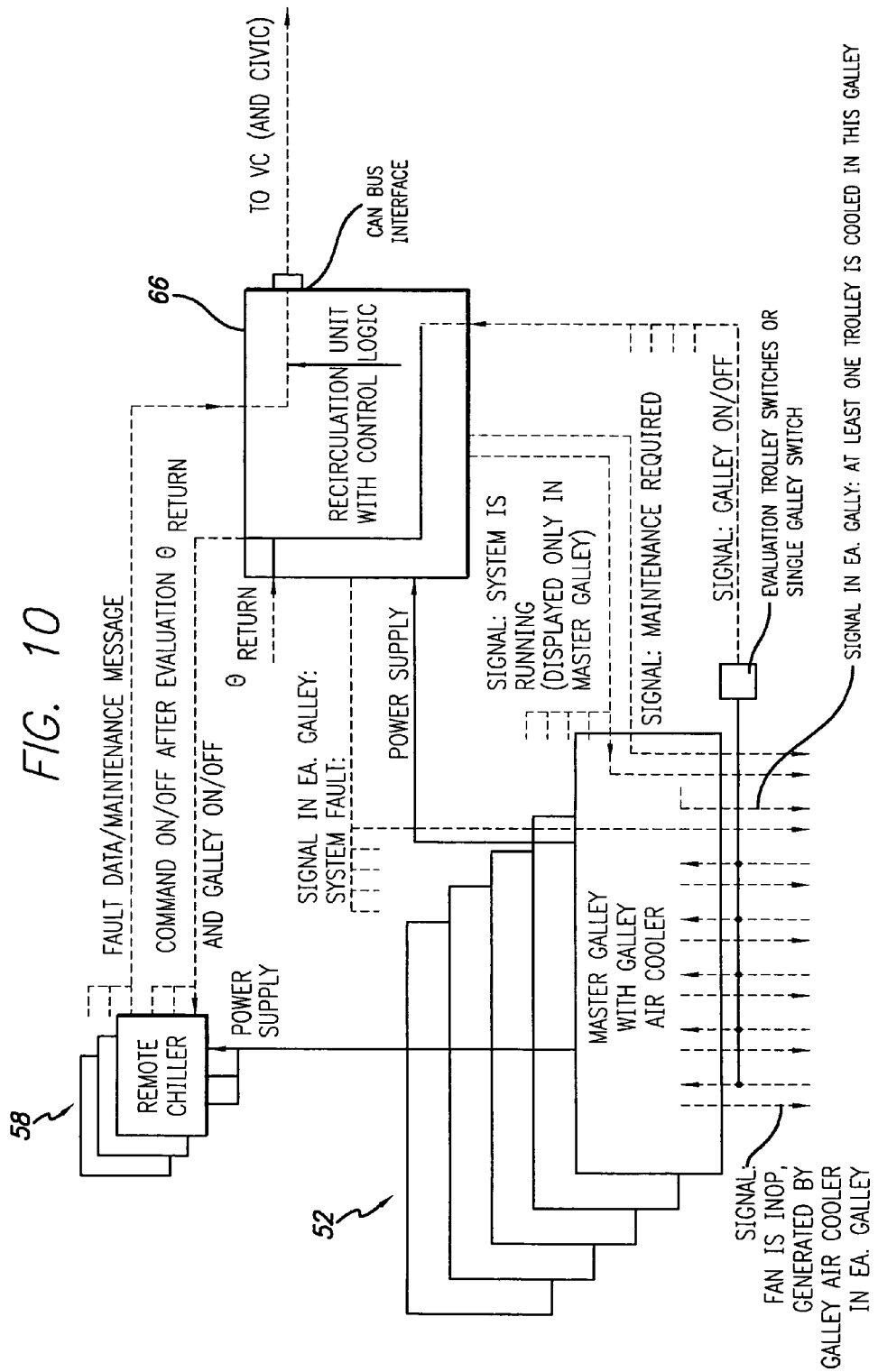
FIG. 10 is a signal block diagram of an electronic control system for controlling the galley refrigeration system for aircraft according to the invention.

As depicted in FIG. 10 the components of the electronic subsystem may be interrelated via the system monitoring and control device 66 also referred to as the recirculation unit with control logic. That is, the same electronic device used to monitor and control the recirculation unit 32 may be programmed to control the overall functioning of the entire system. This may include such functions as malfunction detection and providing maintenance information. Each galley cart control device 52 and chiller unit monitoring device 58 may be configured to send signals to the system monitoring and control device relaying information about the status of the galley air cooling units 18 and remote chiller units 30. In turn, the system monitoring and control device could send signals back to the galley cart control device and chiller unit monitoring device instructing the devices on how to control each galley air cooling unit and remote chiller unit.

Figure 11:
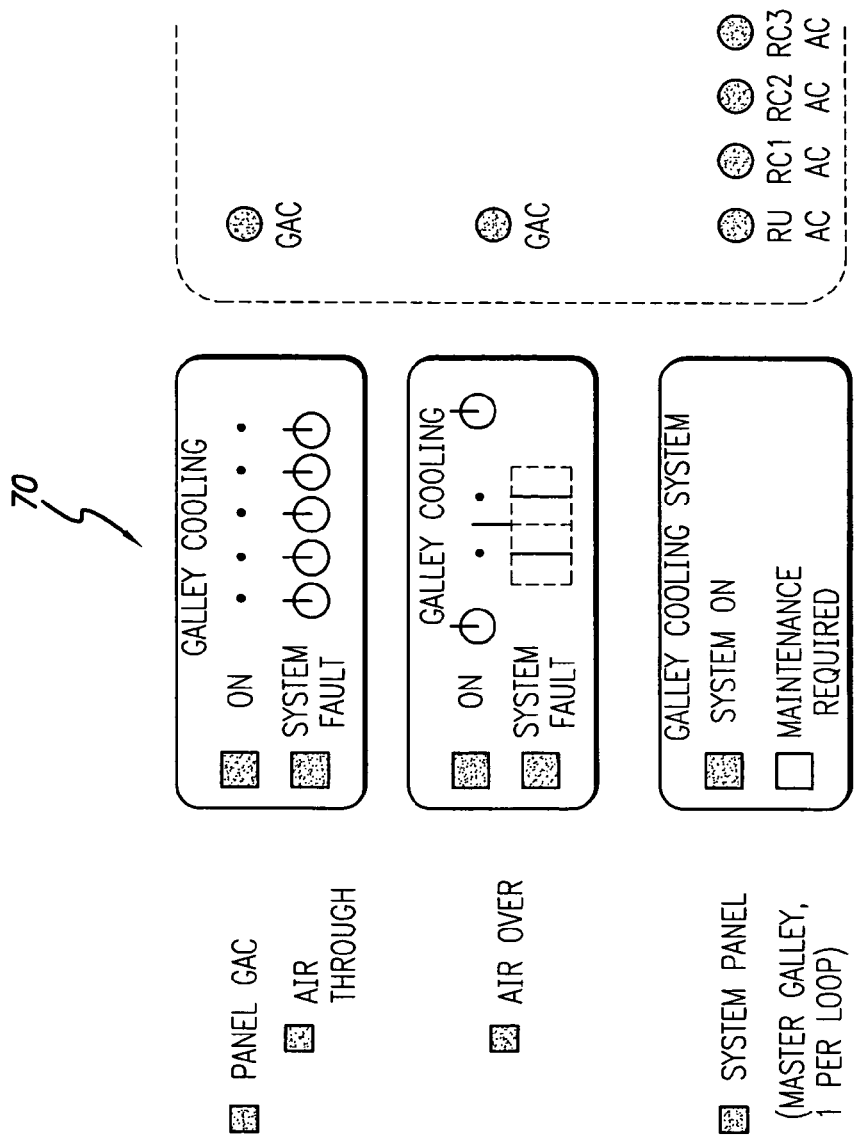
FIG. 11 is a diagram of a control panel for operation of the control system for controlling the galley refrigeration system for aircraft according to the invention.

As depicted in FIG. 11, at least one display 70 may be included with the electronic subsystem. The display enables crew interface with the refrigeration system. A set of lights indicates the status of the various components. A set of switches may permit crew control of the various components. The display may be electronically controlled by the system monitoring and control device 66.

Figure 12:
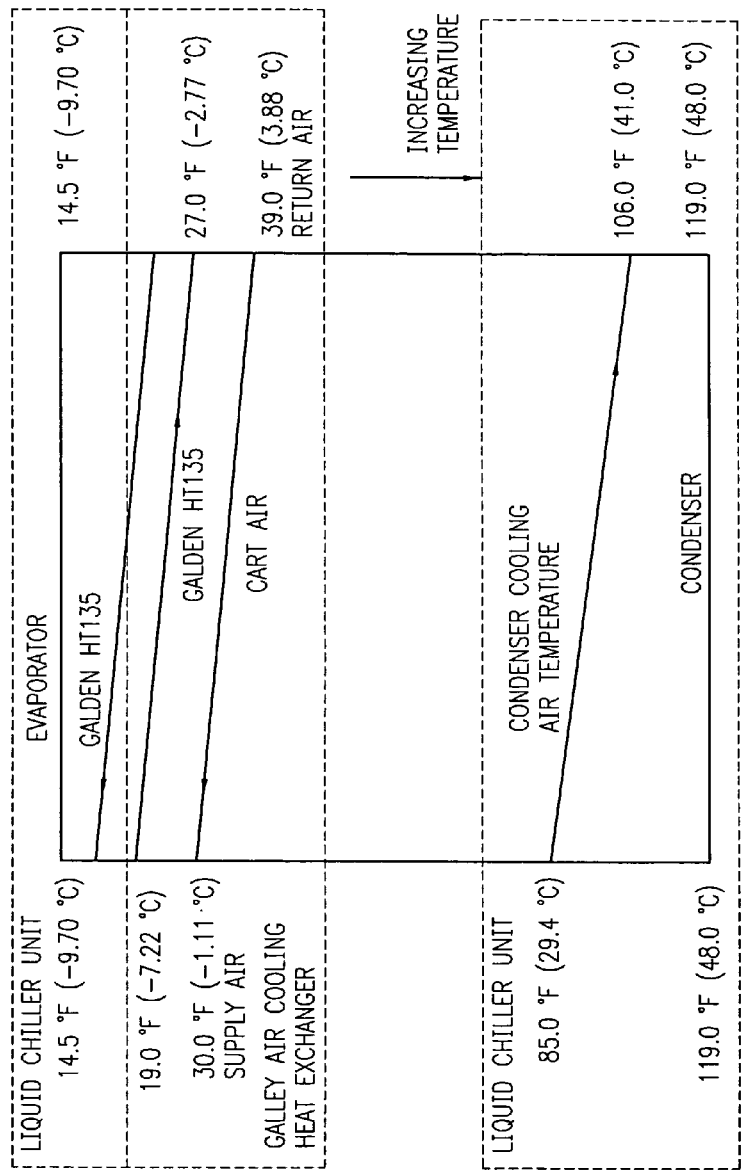
FIG. 12 is an overall thermodynamic chart of the galley refrigeration system for aircraft according to the invention.

FIG. 12 depicts a thermodynamic chart showing the functioning of the refrigeration subsystems. The information provided by the chart is exemplary of a system in accordance with the present invention. The chart depicts the refrigeration process as a series of heat exchanges between the various fluids involved in the process.

It will be apparent to those of skill in the art that the exemplary systems described in this detailed description conform to the invention described. It will also be apparent to those of skill in the art that various modifications may be made to the exemplary systems while remaining within the scope of the invention. Thus, the invention is not intended to be limited to the examples described herein. The scope of the invention is described and limited only by the following claims.

What is claimed is:

1. A method for cooling of onboard food carts on aircraft, comprising:
   providing an onboard food cart galley plenum for receiving an associated food cart;
   providing a galley plenum heat exchanger for transferring heat from onboard food cart galley plenum to a first working fluid for cooling said associated food cart;
   providing a valve for controlling the flow of said first working fluid through said galley plenum heat exchanger so as to control the cooling capacity of said galley plenum heat exchanger;
   providing a recirculation pump for circulating said first working fluid to said galley plenum heat exchanger to cool said galley plenum heat exchanger, said recirculation pump being located remotely with respect to said galley plenum heat exchanger;
   providing a blower for blowing air through said galley plenum heat exchanger to cool said air and for blowing said air through said onboard food cart galley plenum for cooling said onboard food cart galley plenum;
   providing a display indicating a status of said recirculation pump, said valve, and said blower, said display including an interface for controlling said recirculation pump, said valve, and said blower in order to control the temperature within said onboard food cart galley plenum;
   transferring heat from said food cart galley plenum to said circulating first working fluid;
   pumping said first working fluid to said galley plenum heat exchanger for transferring heat from said first working fluid to a second working fluid, said pumping taking place at a location remote from said food cart galley plenum, and said galley plenum heat exchanger being located remotely with respect to said food cart galley plenum;
   cycling said second working fluid between a liquid phase and a gaseous phase at a location remote from said food cart galley plenum and said pumping of said first working fluid; and
   removing heat from said second working fluid.

2. The method of claim 1, wherein said first working fluid undergoes no phase change at any time.

3. The method of claim 2, wherein said first working fluid remains in a liquid phase at all times.

* * * * *